(12) United States Patent
Takahashi et al.

(10) Patent No.: US 6,330,493 B1
(45) Date of Patent: Dec. 11, 2001

(54) CONTROL SYSTEM FOR SYNCHRONOUSLY COOPERATIVE OPERATION OF PLURALITY OF ROBOTS

(75) Inventors: Hiromitsu Takahashi; Tetsuya Kosaka, both of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/664,348

(22) Filed: Sep. 18, 2000

(30) Foreign Application Priority Data

Sep. 16, 1999 (JP) .................................................. 11-262786

(51) Int. Cl.[7] ................................................... G06F 19/00
(52) U.S. Cl. ........................ 700/245; 700/246; 700/247; 700/248; 700/249; 700/250; 700/251; 700/254; 700/264; 310/568.11; 310/568.16; 310/568.17; 901/6; 901/9; 901/46; 701/23
(58) Field of Search ..................................... 700/245, 247, 700/248, 249, 250, 254, 264, 251, 260; 701/23; 707/102, 104.1; 318/568.11, 568.17, 561, 568.16, 573; 901/9, 6, 46, 27, 28, 34, 36

(56) References Cited

U.S. PATENT DOCUMENTS

| | | | |
|---|---|---|---|
| 5,038,089 | * | 8/1991 | Szakaly et al. ........................ 701/23 |
| 5,117,544 | * | 6/1992 | Kousaku et al. . | |
| 5,485,644 | * | 1/1996 | Shinbara et al. . | |
| 5,784,542 | * | 7/1998 | Ohm et al. ............................ 700/260 |
| 5,825,981 | * | 10/1998 | Matsuda ................................ 700/248 |
| 5,844,392 | * | 12/1998 | Peurach et al. ................... 318/568.17 |
| 6,131,097 | * | 10/2000 | Peurach et al. ......................... 707/102 |

FOREIGN PATENT DOCUMENTS

1090722-A2 * 9/2000 (EP) .

OTHER PUBLICATIONS

Kazerooni et al., A controller design framework for telerobotic systems, 1993, IEEE, pp. 90–32.*
Agapakis et al., Programming & control of multiple robotic devices in coordinated motion, 1990, IEEE, pp. 362–367.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A control system for performing a synchronously cooperative operation among some robots of a plurality of robots connected by a communication line. A plurality of robots No. 1 to No. 4 is operated individually and also is operated in synchronous cooperation. Further, some robots No. 1 and 2 is operated in synchronous cooperation while the other robots Nos. 2 and 4 are operated in synchronous cooperation. The robots Nos. 3 and 4 are operated in synchronous cooperation. The robots No. 1 and 3 is operated in synchronous cooperation while the robots Nos. 2 and 4 are operated individually. The synchronously cooperative operation is performed by any desired combination in that the above robot control part keeps motion procedures denoting changes, which are corresponding to the frame notifications of the passage of time from the above media reproduction part; and moves the above robot according toe the above motion procedures, in the corresponding frame.

10 Claims, 11 Drawing Sheets

FIG. 4

|  | MASTER ROBOT | SLAVE ROBOT |
|---|---|---|
| FIRST COMBINATION | No.1 | No.2, No.3, No.4, |
| SECOND COMBINATION | No.1 | No.2 |
| THIRD COMBINATION | No.3 | No.4 |
| FOURTH COMBINATION | No.1 | No.3 |

FIG. 5

| LINK PATTERN No. | MASTER ROBOT | SLAVE ROBOT |
|---|---|---|
| 1 | No.1 | No.2, No.3, No.4, |
| 2 | No.1 | No.2 |
| 3 | No.1 | No.3 |

FIG. 6

| LINK PATTERN No. | MASTER ROBOT | SLAVE ROBOT |
|---|---|---|
| 1 | No.3 | No.4 |

CONTROL SYSTEM FOR SYNCHRONOUSLY COOPERATIVE OPERATION OF PLURALITY OF ROBOTS

BACKGROUND OF THE INVENTION

1. Field of the Invention

The present invention relates to a control system for controlling a plurality of industrial robots, and more particularly a control system for performing a synchronously cooperative operation using the plurality of robots.

2. Description of the Related Art

There has not been provided any practical control system for performing a synchronously cooperative operation using a plurality of robots which are respectively controlled by robot controllers connected with one another by a communication line. In the conventional system for the synchronously cooperative operation of the robots, a changeover between a synchronously cooperative operation and a normal independent operation of the robots is set at the time of constructing the system, and it is necessary to change a basic setting of the system for changing the changeover setting for the synchronous cooperative operation.

A combination of robots to be operated in synchronous cooperation has been fixedly set at the time of system construction. In the case where the system has four robots respectively controlled by four robot controllers connected by communication lines, for example, the conventional system has adopted a method in which all of the four robots are operated in synchronous cooperation by these controllers.

In the practical use, according to content of an operation, there is a case where it is desirable that all of four robots, in the above-described example, operate in synchronous cooperation, a case where it is desirable that each robot operates individually, a case where it is desirable that only two or only three of the four robots operate in synchronous cooperation and the remaining robots operate individually, and further a case where it is desirable that two of the four robots and the remaining two robots respectively operate in synchronous cooperation. However, in the conventional synchronously cooperative operation system, robots to be operated in synchronous cooperation cannot be selected in accordance with the operation to be performed. Such a system is inconvenient in that all the robots are operated either in synchronous cooperation or individually, so that the synchronously cooperative operation of desired robots selected from the robots in accordance with the kind of operation can not be performed.

Furthermore, in the synchronously cooperative operation, an operator of the robots has to pay attention to the motion of the master robot as well as the slave robot since the slave robot operates in accordance with the master robot. However, it is difficult for the operator to recognize the synchronously cooperative operation status of the robots from the motion of the robots.

SUMMARY OF THE INVENTION

According to an aspect of the present invention, a control system for a plurality of robots comprises a plurality of robot controllers connected with one another by a communication line, for respectively controlling the plurality of robots. At least one master robot controller is selected for controlling at least one master robot from the plurality of robot controllers, and one or more slave robot controllers is selected for one or more slave robots from the rest of the plurality of robot controllers. The master robot controller sends data regarding positions of taught points and interpolation points for the master robot to each of the slave robot controllers through the communication line, so that each slave robot controller controls the slave robot thereof to perform the synchronously cooperative operation with the master robot based on the data received from the master robot controller.

According to another aspect of the present invention, a control system for a plurality of robots comprises robot controllers connected with one another by a communication line, for respectively controlling at least three robots. At least one master robot controller is selected for controlling at least one master robot from the robot controllers, and one or more slave robot controllers is selected for controlling one or more slave robots for the master robot from the rest of the plurality of robot controllers. The master robot controller sends data regarding positions of taught points and interpolation points for the master robot to each of the slave robot controllers through the communication line, so that each slave robot controller controls the slave robot thereof to perform the synchronously cooperative operation with the master robot based on the data received from the master robot controller.

Each of the plurality of robot controllers may store a series of operation programs as a combination of a master program to operate the controlled robot as the master robot, a slave program to operate the controlled robot as the slave robot and a normal program to operate the controlled robot independently of the other robots.

The synchronously cooperative operation of the master robot and the slave robots may be started and terminated by a program command in an operation program stored in the master robot controller.

Each of the master controller and the slave controllers may store an operation program with an attribute for the synchronously cooperative operation, and the synchronously cooperative operation of the master robot and the slave robots may start when the master robot controller and the slave robot controller start execution of the operation programs having the attributes of the synchronously cooperative operation, and terminates with completion of the operation programs having the attributes.

The master robot controller and the slave robot controllers may output signals indicative of the midst or the ready of the synchronously cooperative operation when the master robot and the slave robots are in the midst or the ready of the synchronously cooperative operation.

The master robot controller and the slave robot controller may output signals indicative of the midst or the ready of the synchronously cooperative operation when the master robot and the slave robots are in the midst or the ready of the synchronously cooperative operation. Thus, an operator of the robot controller can confirm the status of the synchronously cooperative operation.

BRIEF DESCRIPTION OF THE DRAWINGS

FIG. 4 is a table of a setting example of combinations of robots to perform a cooperative operation;

FIG. 5 is a table of a link pattern set in a robot No. 1 as a master robot in the example of combinations of robots as shown in FIG. 5;

FIG. 6 is a table of a link pattern set in a robot No. 3 as a master robot in the example of combinations of robots as shown in FIG. 5;

DETAILED DESCRIPTION OF THE PREFERRED EMBODIMENTS

Figure 1:
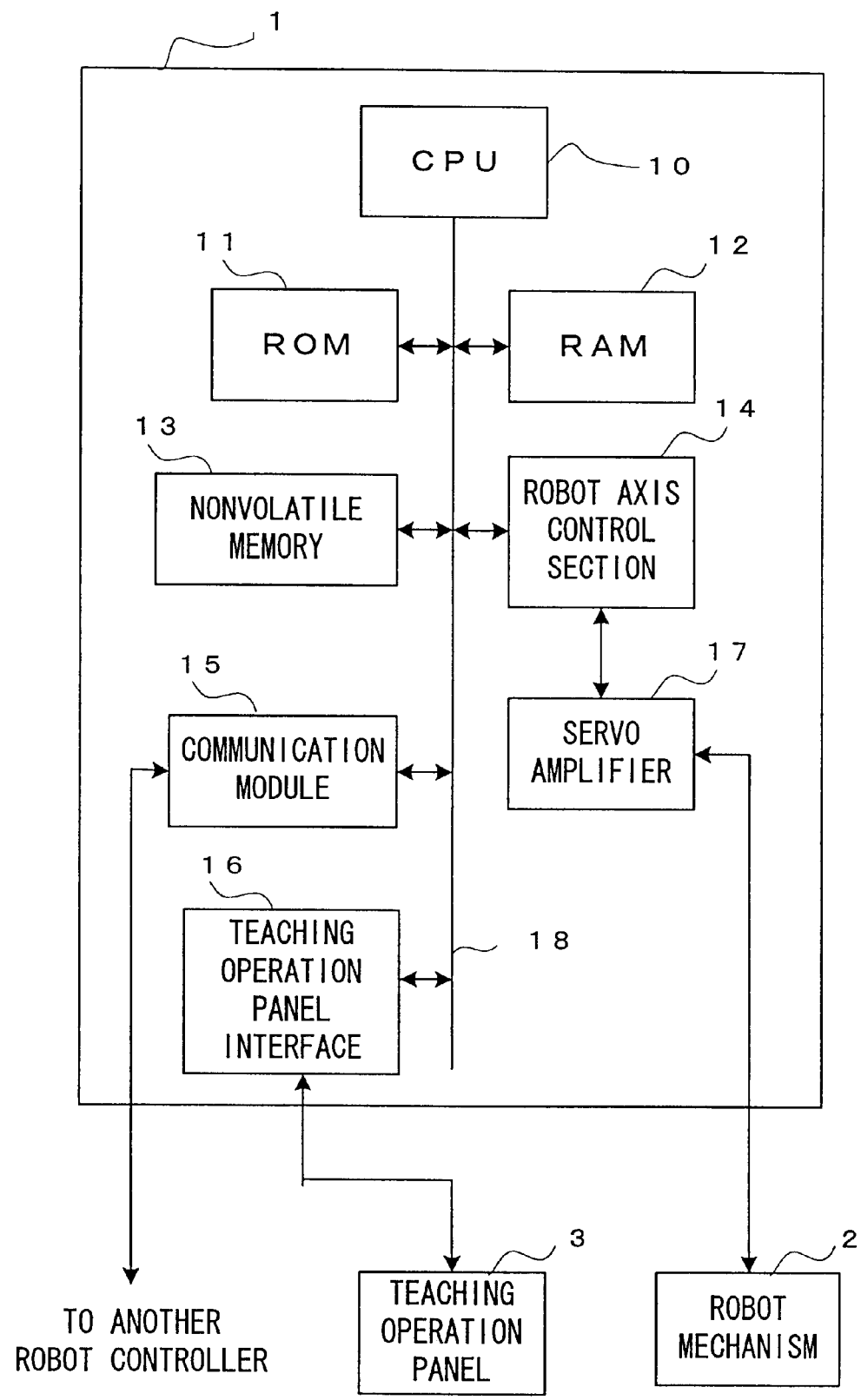
FIG. 1 is a block diagram of an essential part of a robot controller for controlling an associated robot for performing a cooperative operation of a plurality of robots according to an embodiment of the present invention.

FIG. 1 shows a robot controller for controlling each robot for synchronously performing a cooperative operation of a plurality of robots. In FIG. 1, a robot controller 1 has a processor 10 for generally controlling a robot mechanism 2 and the robot controller 1. The processor 10 is connected with a ROM 11, a RAM 12, a nonvolatile memory 13, a robot axis control section 14, a communication module 15, a teaching panel interface 16, etc. via a bus 18. The ROM 11 stores a system program to be executed by the processor 10, and the nonvolatile memory 13 stores set values of various parameters and a taught program for an operation to be performed by the robot mechanism 2. The RAM 12 is used for temporarily storage of data. The robot axis control section 14 performs feedback controls of position, velocity and torque (current) of each motor for each axis by the digital servo control using a processor based on motion commands fro each axis, to drive the servomotor for each axis of the robot mechanism section 2 via a servo amplifier 17. The communication module 15 is connected to another robot controller by a communication path. The teaching operation panel interface 16 is connected with a teaching operation panel 3.

The above basic configuration of each robot controller is the same as that of the conventional one, and the robot controllers of such configuration are connected to one another via a signal path of communication lines, to constitute a control system for a synchronously cooperative operation of a plurality of robots.

The following is a description on a robot control system for controlling four robots by the robot controllers connected by the signal path for respectively controlling the associated robots, to sequentially perform individual operations and a synchronously cooperative operation of the robots in an arbitrary combination.

Figure 2:
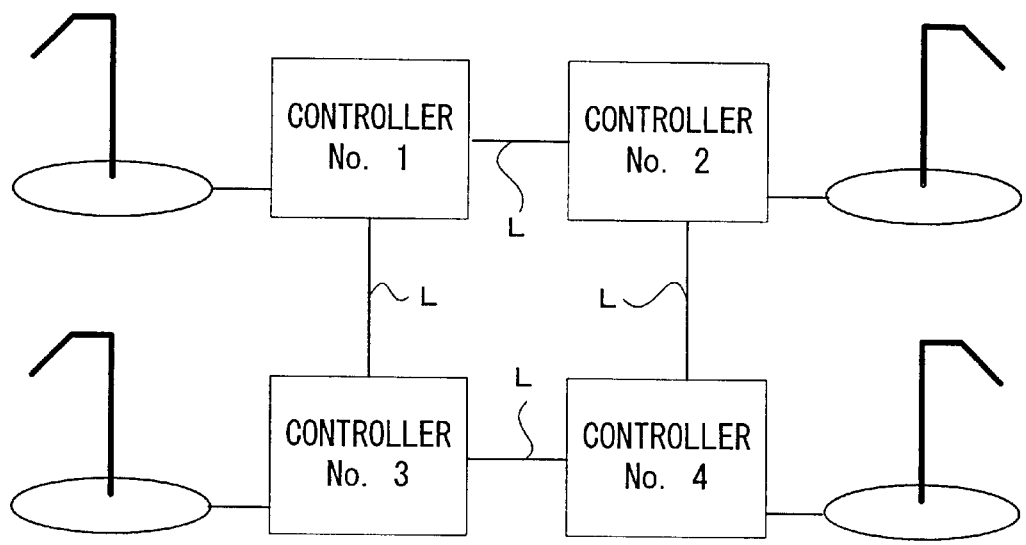
FIG. 2 is a schematic diagram showing an example of a network of the robot controllers connected by communication lines.
Figure 3:
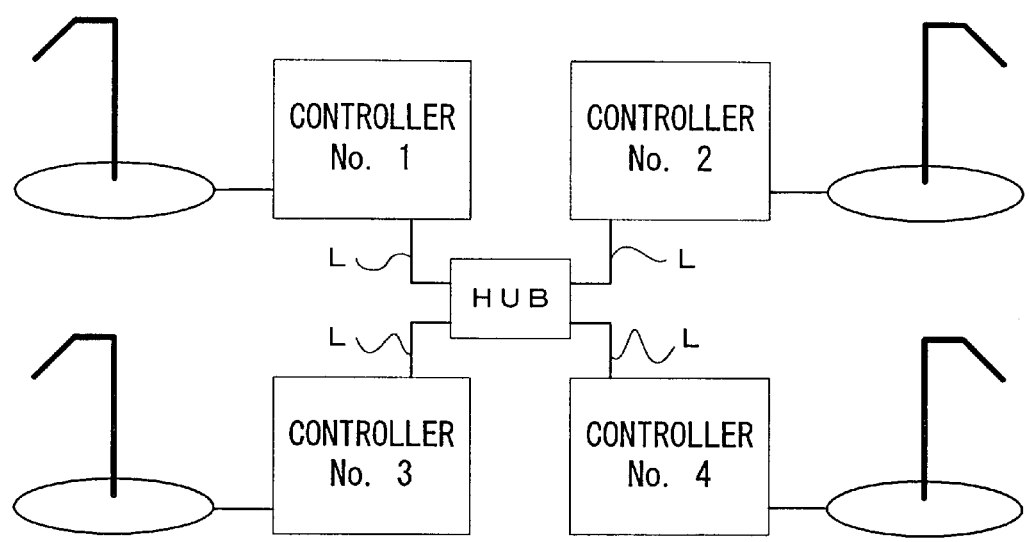
FIG. 3 is a schematic view showing another example of a network of the robot controllers connected by communication lines.

FIGS. 2 and 3 show examples of connection of the four robot controllers connected by a communication network of Ethernet. Any network other than Ethernet may be used. In an example of FIG. 2, the robot controllers No. 1 to No. 4 are connected to one another by signal lines L to form a signal path. In the example of FIG. 3, the robot controllers Nos. 1–4 are connected to one another by using a hub. To identify each robot connected by the communication lines L, each robot number is applied to each robot, and in the nonvolatile memory of each robot, the robot number assigned to that robot is set and stored. In the examples shown in FIGS. 2 and 3, the number of No. 1 to No. 4 are set and stored. In the following description, No. 1 to No. 4 are used for robot No. 1 to No. 4 and robot controller No. 1 to No. 4. Also, robots No. 1 to No. 4 are used.

Further, a transformation matrix from each robot to another robot is set by calibrating the installation position between the robots. For example, when the robot No. 2 is viewed from the robot No. 1, it is necessary to determine a position in a world coordinate system of the robot No. 1 at which a world coordinate system of the robot No. 2 lies. For this purpose, for example, a transformation matrix $T_{2-1}$ from the world coordinate system of the robot No. 1 to the world coordinate system of the robot No. 2 is determined. This is done for all patterns. However, since the inverse matrix of the transformation matrix $T_{2-1}$ from No. 1 to No. 2 is the transformation matrix from No. 2 to No. 1, when the transformation matrix from No. 1 to No. 2 is determined, it is unnecessary to determine the transformation matrix from No. 2 to No. 1. The transformation matrix thus determined is stored in the nonvolatile memory 13 of each robot controller. For example, the transformation matrix $T_{1-2}$ from No. 2 to No. 1 is stored in the controller of the robot No. 2. Similarly, each transformation matrix is stored in the nonvolatile memory 13 of each robot controller, for example, the transformation matrix $T_{1-3}$ from No. 3 to No. 1 is stored in the robot controller No. 3, the transformation matrix $T_{1-4}$ from No. 4 to No. 1 is stored in the robot controller No. 4, and the transformation matrix $T_{2-3}$ is stored in the robot controller No. 3.

In the calibration method, as having been carried out so far, a calibration rod is attached to wrists of two robots to be calibrated, and a distal end thereof is set so as to be a TCP (tool center point). Then, the distal ends of the calibration rods are positioned at three points (a triangle is formed with the three points being the vertexes) in a space that do not lie on the same straight line, and the positions are determined by the respective world ordinate system. Thereafter, the transformation matrix $T_{2-1}$ from the robot No. 1 to the robot No. 2 is calculated from the determined three position data on the world coordinate system of the robot No. 1 and three position data on the world coordinate system of No. 2. Similarly, each transformation matrix is determined, and is stored in the nonvolatile memory of each robot controller.

Next, combinations of robots to be synchronously operated for cooperation are determined, and a master robot and one or more slave robots in the combination are determined.

FIG. 4 shows an example of the combinations. In the first combination, all of four robots cooperate in synchronism with the robot No. 1 used as a master robot and other robots used as slave robots. In the second combination, the robot No. 1 and the robot No. 2 cooperate in synchronism with the robot No. 1 as a master robot and the robot No. 2 as a slave robot. In the third combination, a synchronously cooperative operation is performed in the combination of the robot No. 3 as a master robot and the robot No. 4 as a slave robot. In the fourth combination, a synchronously cooperative operation is performed by the combination of the robot No. 1 as a master robot and the robot number No. 3 as a slave robot.

The robots that are not specified as a master robot or slave robots may be used as normal robots, that is, they are operable independently while the master robot and the slave robot of each combination perform the synchronously cooperative operation. For example, in the second combination, the robots No. 3 and No. 4 can be used as the normal robots, and in the third combination, the robots No. 1 and No. 2 can be used as the normal robots. In the fourth combination, the robots No. 2 and No. 4 can be used as the normal robots.

In each combination of the robots to be operated in synchronously cooperation, one robot is selected to be a master robot, and one or more robots are selected to be slave robots among the rest of the robots connected by the communication line.

After a combination in which a synchronously cooperative operation is performed is determined, a combination pattern is set. In this example, the combination pattern is set in the master robot controller. The combination pattern may be set in the slave robot controller. In the above-described combinations, since the robot No. 1 is the master robot in the combination numbers 1, 2 and 4, the robot number No. 1 is stored as the master robot and the robot numbers No. 2, No. 3 and No. 4 are stored as the slave robots as a link pattern 1 in the nonvolatile memory 13 of the robot controller No. 1, as shown in FIG. 5. As a link pattern 2, the robot number No. 1 is stored as the master robot and the robot number No. 2 is stored as the slave robot. Further, as a link pattern 2, the robot number No. 1 is stored as the master robot and the robot number No. 3 is stored as the slave robot.

Similarly, in the robot controller No. 3, as shown in FIG. 6, according to the third combination the robot number No. 3 is stored as the master robot and the robot number No. 4 is stored as the slave robot as a link pattern 1. The controller for the specified master robot will be referred to as a master robot controller, and the controller for the specified slave robot will be referred to as a slave robot controller.

Figure 7:
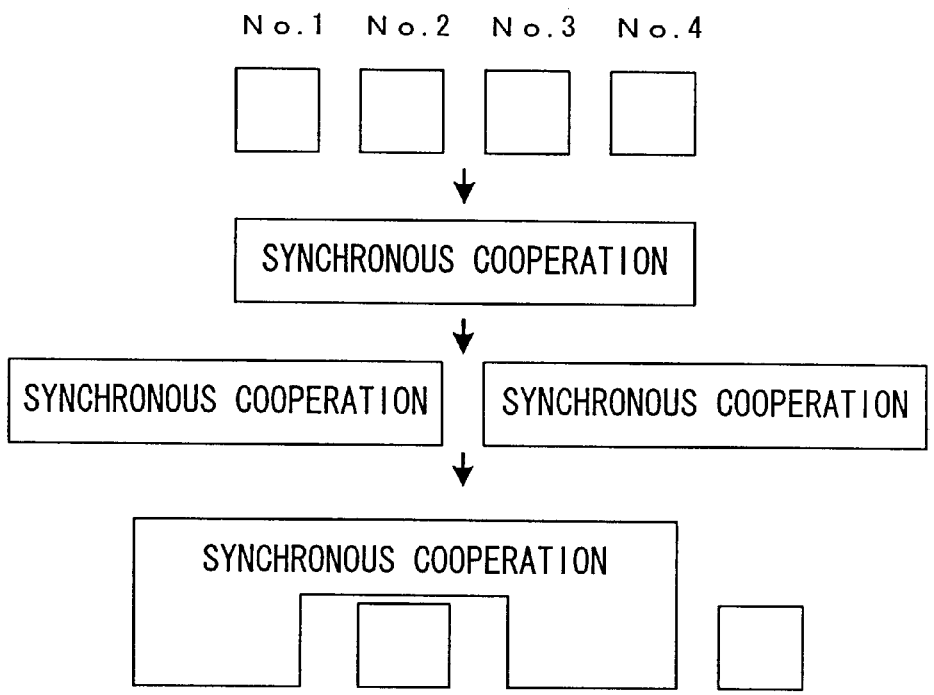
FIG. 7 is a diagram for showing the operation sequence of the robots in the example of combinations of robots as shown in FIG. 5.

A program according to the operation sequence is set for the controller of each robot. For example, as shown in FIG. 7, first, each of the robots No. 1 to No. 4 is operated independently, and then all the robots No. 1 to No. 4 are operated in synchronous cooperation by the first combination. After this operation is finished, the robots No. 1 and No. 2 are operated in synchronous cooperation according to the second combination, and simultaneously the robots No. 3 and No. 4 are operated in synchronous cooperation according to the third combination. Finally, the robots No. 1 and No. 3 are operated in synchronous cooperation according to the third combination and the robots No. 2 and No. 4 are operated independently.

Figure 8:
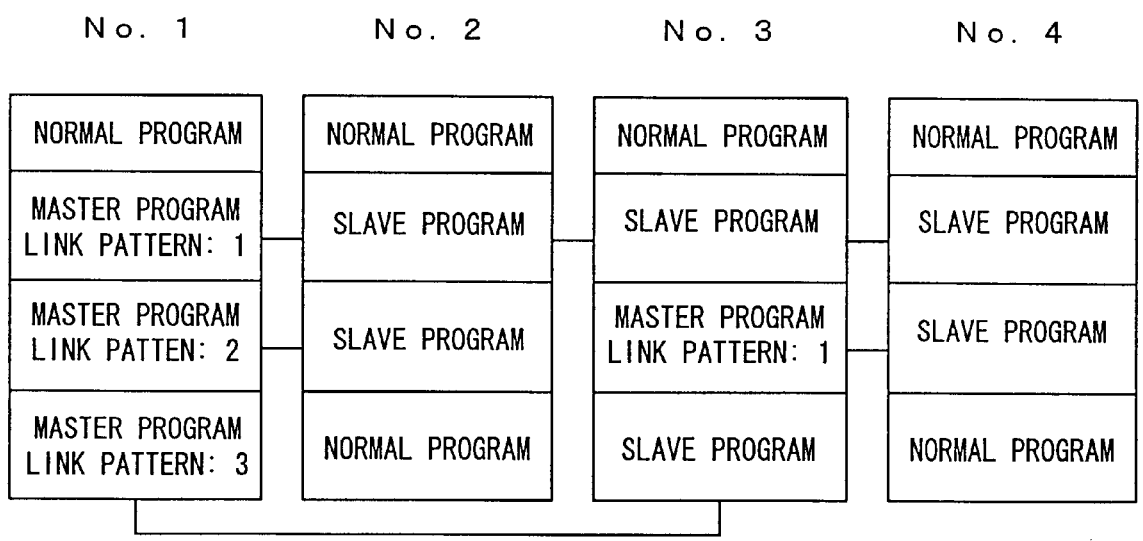
FIG. 8 is a diagram of a program sequence stored in each robot in one example of the operation sequence as shown in FIG. 7.
Figure 9:
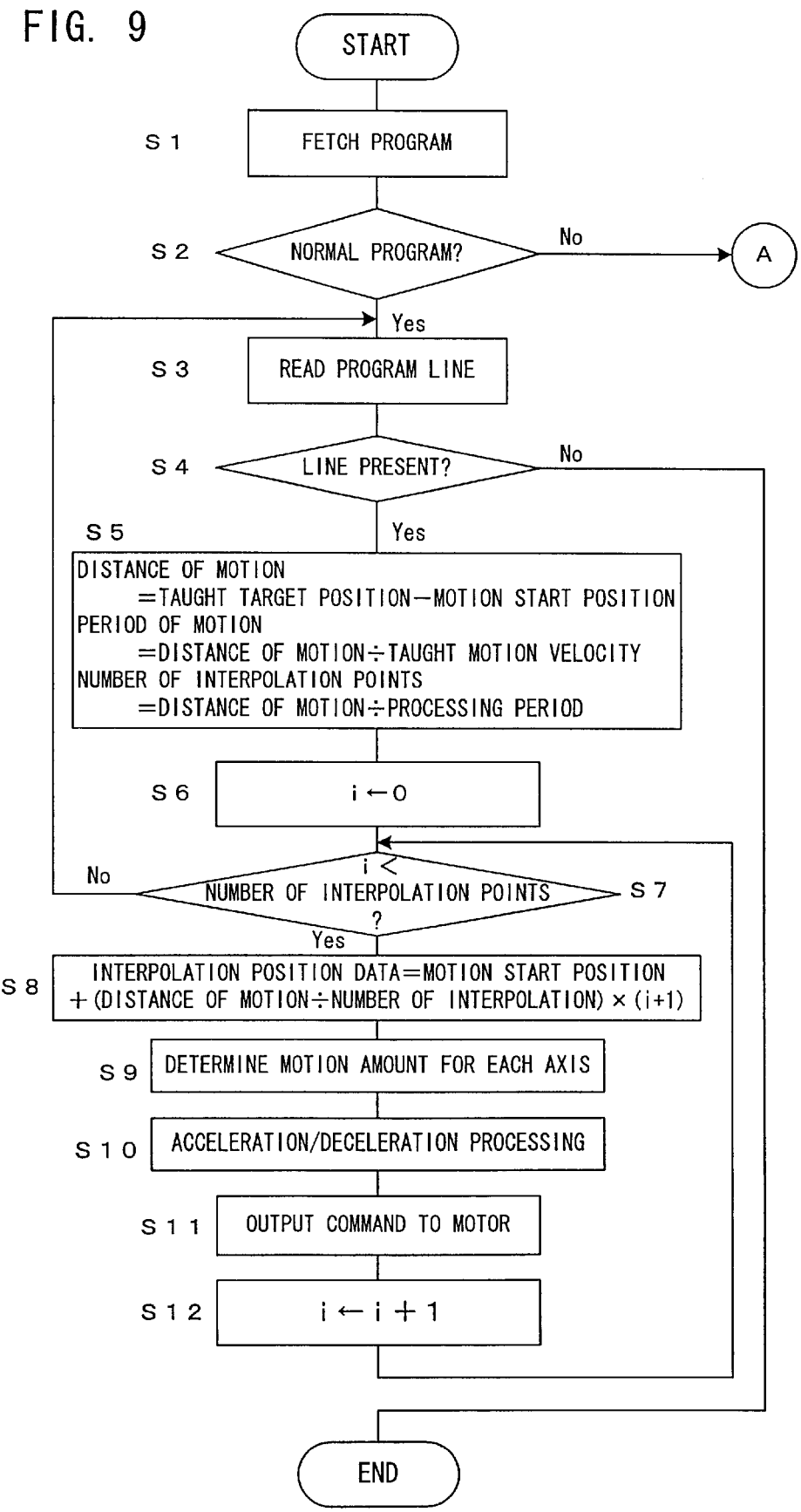
FIG. 9 is a partial flowchart of processing to be executed by the processor of the robot controller of each robot as shown in FIG. 1, which is mainly a flowchart of processing to be performed by the robot controller for the robot to operate independently (execution of a normal program)
Figure 10:
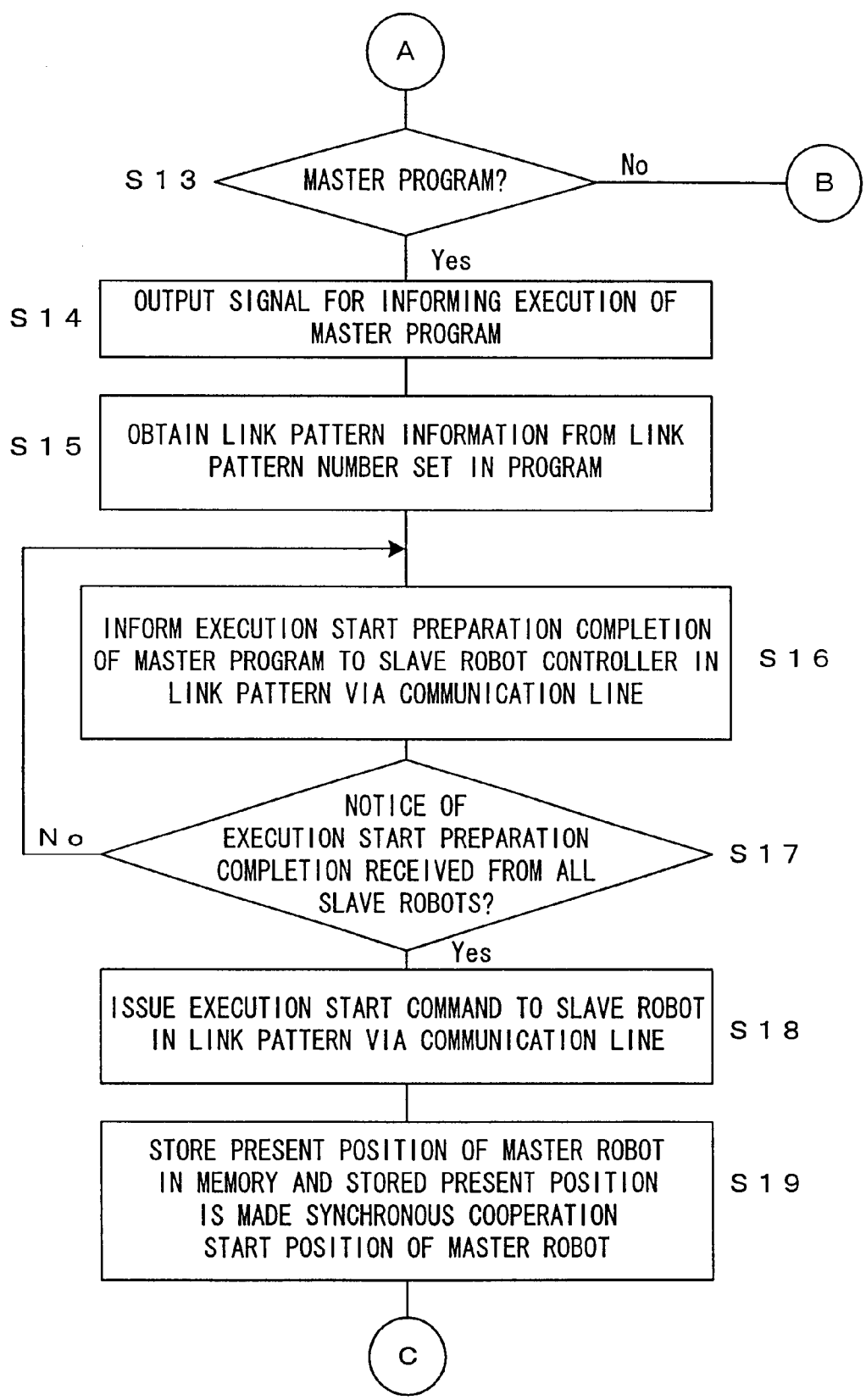
FIG. 10 is a continuation of the flowchart of FIG. 9, which is a part to be executed by the processor of a master robot controller (execution of a master program)
Figure 11:
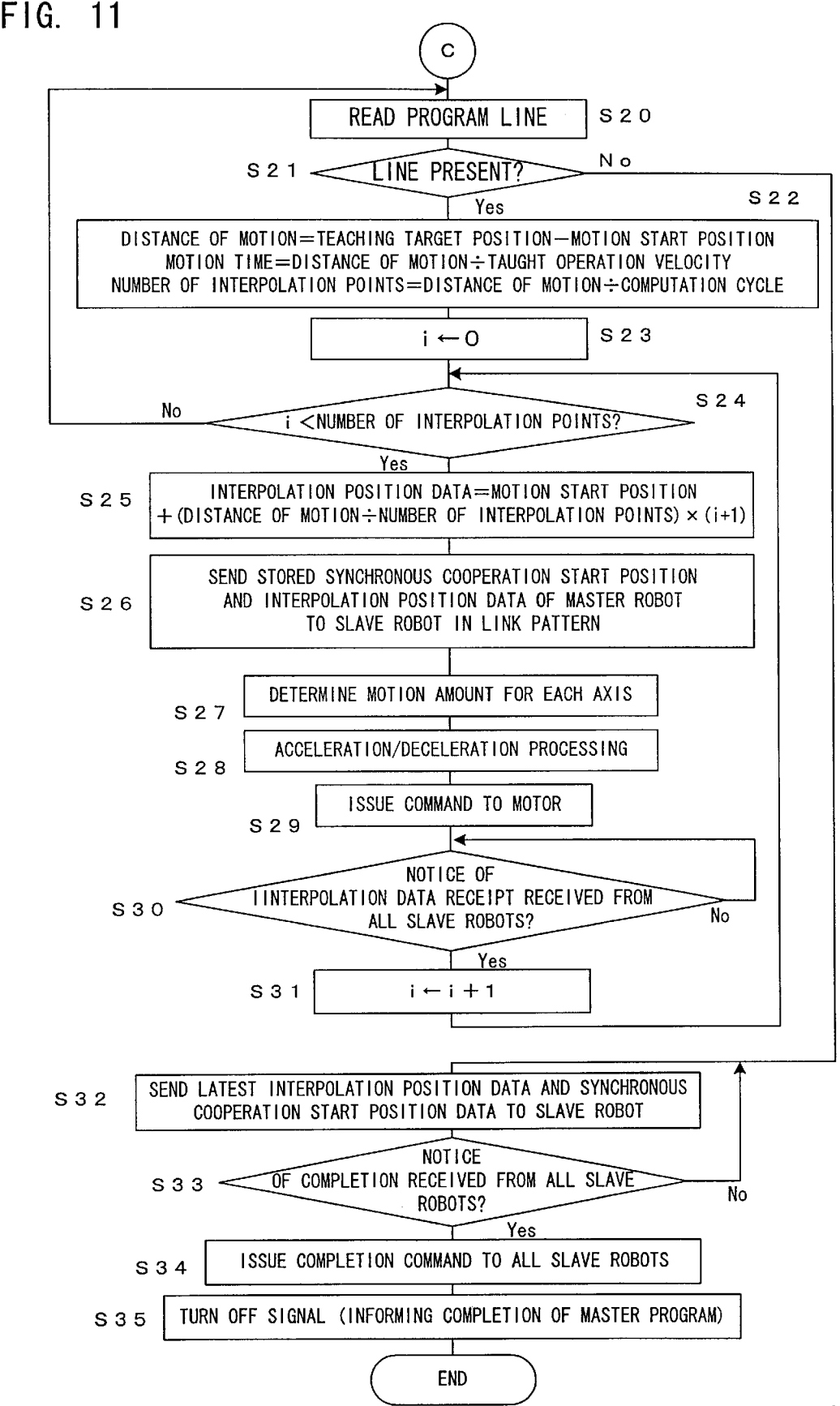
FIG. 11 is a continuation of the flowchart of FIG. 10 to be executed by the processor of the master robot controller (execution of the master program)
Figure 12:
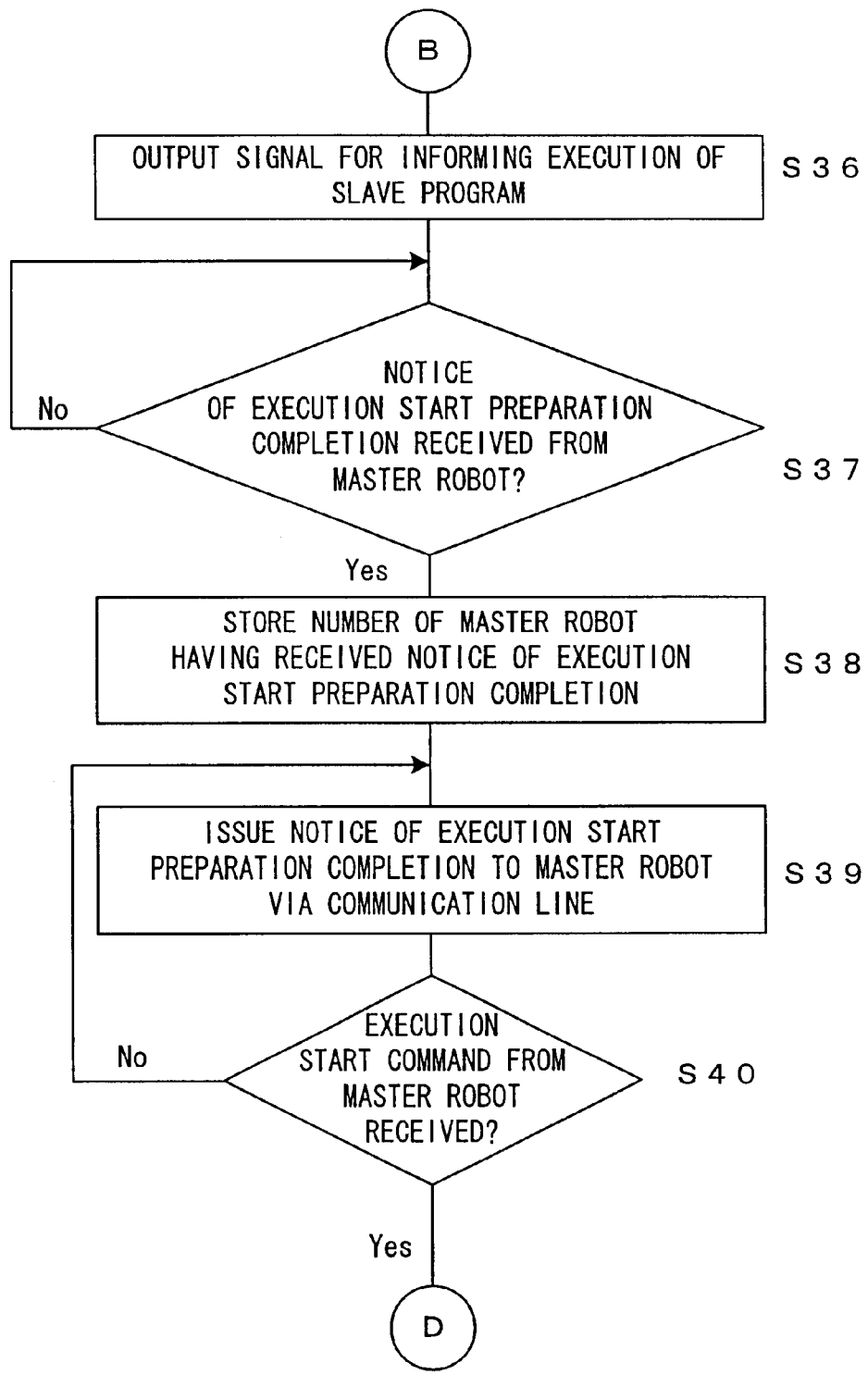
FIG. 12 is a continuation of the flowchart of FIG. 10, which is a part of to be executed by a slave robot controller (execution of a slave program)
Figure 13:
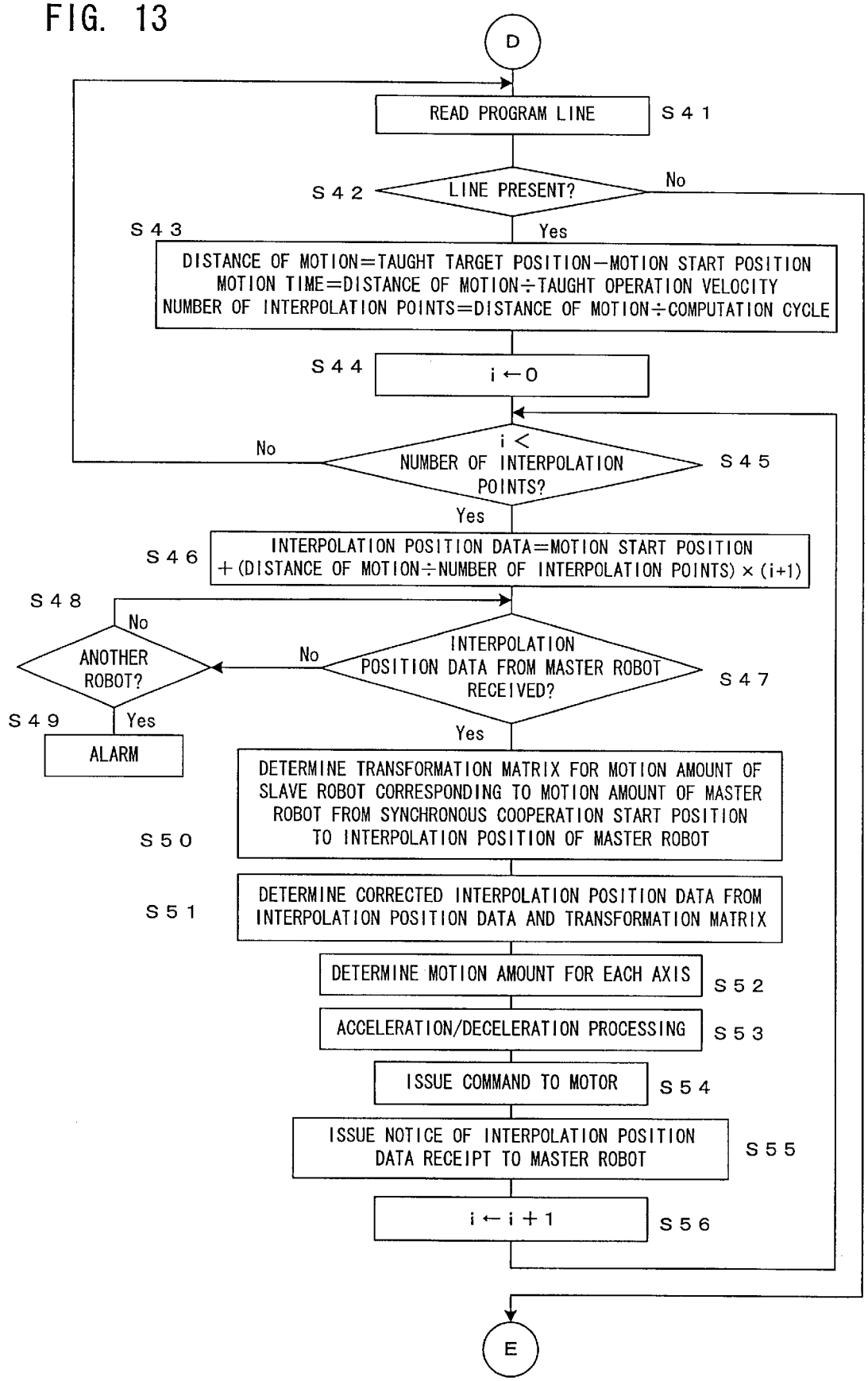
FIG. 13 is a continuation of the flowchart of FIG. 12 to be executed by the slave robot controller (execution of the slave program)
Figure 14:
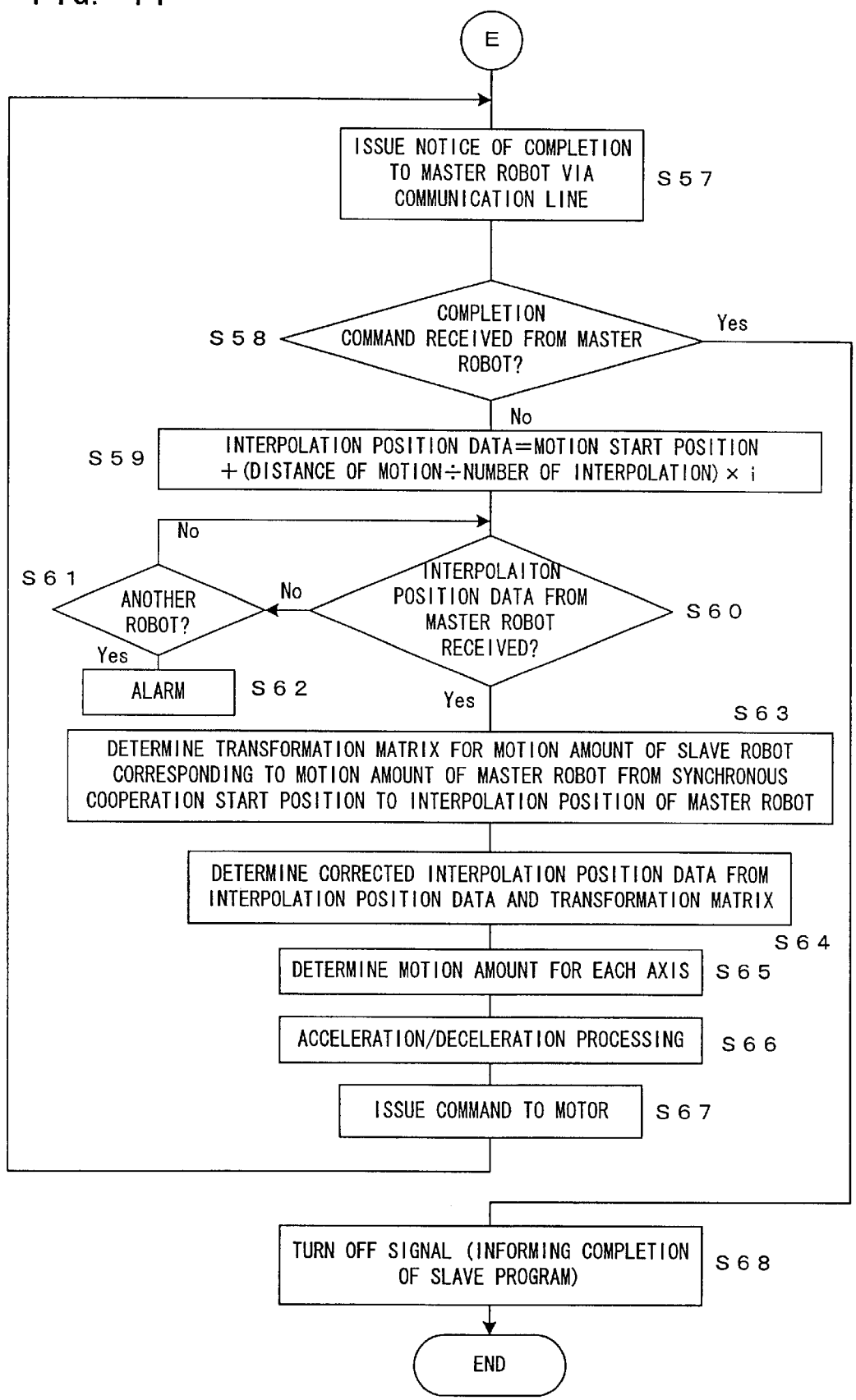
FIG. 14 is a continuation of the flowchart of FIG. 13 to be executed by the slave robot (execution of the slave program)

So as to achieve the above sequence of operations, operation programs are set and stored in the nonvolatile memory 13 of each robot controller in the order as shown in FIG. 8. In the following description, a program for operating a robot independently will be referred to as a normal program, a program for a master robot for performing a synchronously cooperative operation will be referred to as a master program, and a program to be executed by a slave robot will be referred to as a slave program.

The program sequence to be set and stored in the robot controller No. 1 is in the order of the normal program, the master program for synchronously cooperative operation according to the first combination (link pattern 1), the master program for synchronously cooperative operation according to the second combination (link pattern 2), and the master program for synchronously cooperative operation according to the fourth combination (link pattern 3).

Also, the program sequence to be set and stored in the robot controller No. 2 is in the order of the normal program, the slave program for synchronously cooperative operation according to the first combination (link pattern 1), the slave program for synchronously cooperative operation according to the second combination (link pattern 2), and the normal program.

In the robot controller No. 3, the programs are set in the order of the normal program, the slave program for synchronously cooperative operation according to the first combination, the master program for synchronously cooperative operation according to the third combination, and the slave program for synchronously cooperative operation according to the fourth combination. In the robot controller No. 4, the programs are set and stored in the order of the normal program, the slave program for synchronously cooperative operation according to the first combination, the slave program for synchronously cooperative operation of the third combination (link pattern 1 set in the robot controller No. 3), and the normal program.

In each of the normal program, master program, and slave program, information as to which the program is a normal program, master program, or slave program is stored as an attribute or a program command at the head thereof.

Thus, after each program is stored in the nonvolatile memory of each robot controller, the program is started to be executed. Then, the processor 10 of each robot controller 1 starts processing shown in a flowchart of FIGS. 9 to 14.

First, the stored program is read (Step S1), and it is determined whether the read program is a normal program or not (Step S2). In the above-described example, since each robot reads a normal program as shown in FIG. 8, the procedure proceeds to Step S3, where the next program line is read, and then it is determined whether the line is present or not (Step S4). If the line is present, the motion start position (present position) on that line is deducted from the teaching target position (TCP position) programmed on that line to determine a distance of motion, and further it is divided by the operation velocity at which the distance of motion is taught to determine a motion time. Also, the motion time is divided by the computation cycle for interpolation to determine the number of interpolation points (Step S5).

Next, an index i is set at "0", and it is determined whether or not the index i is smaller than the number of interpolation points determined in Step S5 (Step S7). If the index i is smaller than the number of interpolation points, a value obtained by multiplying a value (i+1), which is obtained by adding "1" to the index i, by a value obtained by dividing the distance of motion determined in Step S5 by the number of interpolation points is added to the motion start position on that line, by which interpolation position data is determined (Step S8).

A motion amount (incremental amount) of each axis is determined based on this interpolation data (Step S9), the motion amount of each axis is subjected to acceleration/ deceleration processing (Step S10), and a command is issued to a motor (Step S11). Specifically, a motion command value of each axis, which has been subjected to acceleration/deceleration processing, is output to the axis control section 14 of the robot, loop control for position, velocity, current, etc. is carried out, and a servomotor for each axis of the robot mechanism section 2 is driven via the servo amplifier 17.

Next, the index i is increased by "1" (Step S12), and the control returns to Step S7 to repeatedly execute the processing in Steps S7 through S12 until the index i reaches the number of interpolation points. When the index i reaches the number of interpolation points, the control goes from Step S7 to Step S3 where the next program line is read. The processing in Step S3 and the following steps is executed repeatedly until the read line becomes absent. If the line becomes absent, the processing of this normal program is completed.

Then, the next program is read, and it is determined whether the program is a normal program or not (Steps S1 and S2). In the example shown in FIG. 8, the master program is read for the robot No. 1, and the slave program is read for other robots. Therefore, the control goes from Step S2 to Step S13, where it is determined whether the read program is a master program or not. For the robot No. 1, which is a master robot, since the master program is read, the processing in Steps S15 through S34 is started. For other robots, which are slave robots, the control goes from Step S13 to Step S37, where it is determined whether or not a notice of execution start preparation completion has been received from the master robot.

The processor 10 of the controller (as a master robot controller) of the robot No. 1 as a master robot outputs a signal for informing the execution of the master program to an operator of the robot control system (Step S14), and reads link pattern information from the link pattern number set in the program (Step S15). In the above-described example, the link pattern 1 is read. The notice of execution start preparation completion of the master program is issued to the slave robot stored in the link pattern corresponding to the read link pattern information via the communication line (Step S16), and it is determined whether or not notices of execution start preparation completion have been received from all notified slave robots (Step S17). The processing in Steps S16 and S17 is executed repeatedly until the notices are received.

On the other hand, the processor of the slave robot controller outputs a signal for informing the execution of the slave program to the operator of the robot control system (Step S36), and determines whether or not a notice of execution start preparation completion has been received from the master robot (Step S37). If the notice has been received, the number of the master robot that has received this notice of execution start preparation completion is stored in the nonvolatile memory 13 (Step S38), and a notice of execution start preparation completion of slave robot is issued to the stored master robot via the signal line (Step S39). The processing in Steps S39 and S40 is executed repeatedly until an execution start command is received from the stored master robot.

Specifically, the notice of execution start preparation completion is exchanged between the master robot and the slave robot. After the master robot receives the notice of execution start preparation completion from all the slave robots (Step S17), the execution start command is issued to all the slave robots (Step S17).

When the normal and independent operation of each robot is first performed and then the synchronously cooperative operation is performed with all robots as shown in FIG. 8, even if the master robot finishes the execution of normal program and reads the next master program, the synchronously cooperative operation is not started until the notices of execution start preparation completion are received from all the slave robots. Also, unless the slave robot finishes the execution of normal program, which is a previous independent operation, the slave robot does not perform the processing in Step S37, and naturally, it does not give the notice of execution start preparation completion in Step S39. Therefore, the next synchronously cooperative operation is not executed until all the robots finish the processing of independent and normal program.

Inversely, even when the precessing of normal program of the master robot becomes latest, the notice of execution start preparation completion is not sent from the master robot to each of the slave robots, so that the next synchronously cooperative operation is not executed until the master robot finishes the processing of normal program and the normal operation of all the robots is finished.

When for the robots in the link pattern in which the synchronously cooperative operation is executed, the operations of all the robots that have been performed before the execution of synchronously cooperative operation have been finished, and the master robot has received the notice of execution start preparation completion from all the slave robots (in this case, robots No. 2 to No. 4) in the link pattern in Step S17, the processor of the master robot issues the execution start command to the slave robots in the link pattern (Step S17). The processor of the master robot stores the present position at this time in the nonvolatile memory 13 as a synchronously cooperative operation start position (Step S19). Then, the next line of program is read, and the processing in Steps S20 through S24, which is the same as the above-described processing in Steps S3 through S7. Specifically, if a programmed line is present, the distance of motion, the motion time, and the number of interpolation points are determined, and the index i is set at "0". If the index i is smaller than the number of interpolation points, the processing in Step S25, which is the same as the above-described processing in Step S8, is executed to determine the interpolation position data. That is, the interpolation position data is determined by performing the following computation.

Interpolation position data=motion start position of that line+(distance of motion÷number of interpolation points)×(i+1)

The processor of the master robot sends the stored synchronously cooperative operation start position of the master robot and the interpolation position data determined in Step S25 to all the slave robots in the link pattern via the communication lines (Step S26), determines the motion amount on each axis based on the interpolation position data determined in Step S25, which is the same processing as that in Steps S9, S10, and S11, and performs acceleration/ deceleration processing to give a command to the motor (Steps S27, S28, and S29). Subsequently, the master robot waits until a notice of interpolation position data receipt completion is sent from all the slave robot in the link pattern (Step S30).

On the other hand, when the slave robot receives, in Step S40, the execution start command issued by the processor of the master robot in the processing in Step S17, the processor of the slave robot executes the same processing as that in Steps S20 through S24. Specifically, the next line of the slave program is read, and if the line is present, the distance of motion, the motion time, and the number of interpolation points by this line are determined, the index i is set at "0", and it is determined whether or not the index i is smaller than the number of interpolation points (Steps S41 through S45). If the index i is smaller than the number of interpolation points, the same processing as the above-described processing in Steps S8 and S25 is performed. Specifically, a value obtained by multiplying a value obtained by adding 1 to the index i by a value obtained by dividing the distance of motion determined in Step S43 by the number of interpolation points is added to the motion start position on that line, by which the interpolation position data is obtained (Step S46).

Then, the slave robot waits until the interpolation position data and the synchronously cooperative operation start position data from the master robot stored in Step S38 are received (Step S47). If the received interpolation position data is not the data from the stored master robot (Step S48), the slave robot issues an alarm and stops (Step S49). On the other hand, if the interpolation position data and the synchronously cooperative operation start position data issued in Step S26 by the stored master robot are received, the processor of the slave robot determines a transformation matrix to the motion amount of slave robot corresponding to the motion amount of master robot from the received synchronously cooperative operation start position data and interpolation position data (Step S50), and determines the corrected interpolation position data of slave robot to which the motion amount of master robot is added based on the determined transformation matrix and the interpolation position data of slave robot determined in Step S46 (Step S51).

Figure 15:
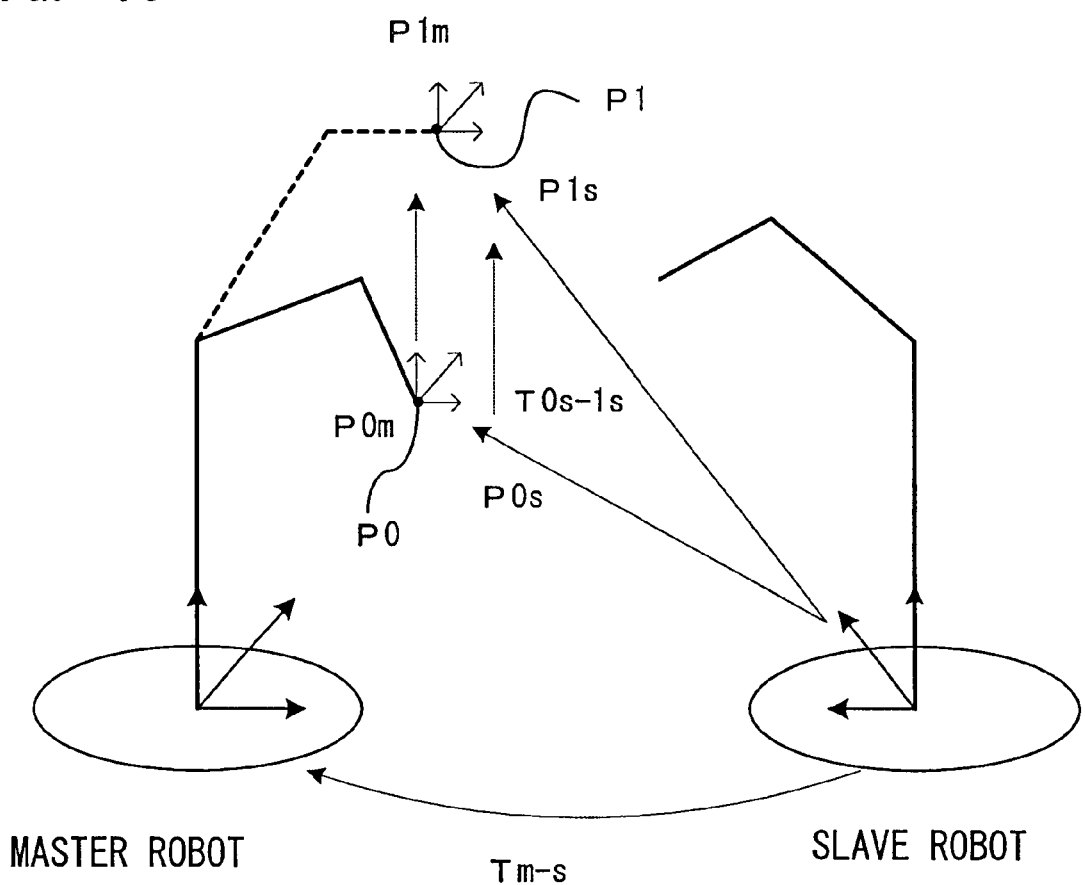
FIG. 15 is a schematic view of a method for determining interpolation position data of a slave robot on which the motion amount of a master robot is reflected.

A method for determining the corrected interpolation position data of slave robot to which the motion amount of master robot is added will be described with reference to FIG. 15.

P0: an arbitrary position in the space

P1: an arbitrary position in the space, which is different from P0

P0s: a position at which P0 is viewed from the world coordinate system of slave robot P1s: a position at which P1 is viewed from the world coordinate system of slave robot P0m: a position at which P0 is viewed from the world coordinate system of master robot P1m: a position at which P1 is viewed from the world coordinate system of master robot Tm-s: a transformation matrix in the case where the world coordinate system of master robot is viewed from the world coordinate system of slave robot T0s-1s: a transformation matrix from P0s to P1s in the world coordinate system of slave robot in the case of being viewed from a slave robot $$P1s = T0s\text{-}1s | P0s \quad (1)$$

$$P1s = Tm\text{-}s | P1m \quad (2)$$

$$P0s = Tm\text{-}s | P0m \quad (3)$$

From Equations (1), (2) and (3), $$Tm\text{-}s | P1m = T0s\text{-}1s | Tm\text{-}s | P0m \quad (4)$$

Therefore, $$T0s\text{-}1s = Tm\text{-}s | P1m | INV(Tm\text{-}s | P0m) \quad (5)$$

where, INV means an inverse matrix.

In Equation (5), Tm-s is a transformation matrix in the case where the world coordinate system of master robot is viewed from the world coordinate system of slave robot (in the case where the master robot is the robot No. 1 and the slave robot is the robot No. 2, this transformation matrix is $T_{1\text{-}2}$), and it is set and stored in the nonvolatile memory of the slave robot by the calibration made first. Also, by making the calculation in Equation (5) taking P0m as the synchronously cooperative operation start position sent from the master robot and P1m as the master robot interpolation position sent from the master robot, the transformation matrix T0s-1s for determining the motion amount in the world coordinate system of slave robot corresponding to the motion amount of master robot can be determined.

As shown in the following equation, by multiplying the determined transformation matrix T0s-1s by the interpolation position data of slave robot determined in Step S46, the interpolation position data of slave robot which the motion amount of master robot is reflected on (added to) can be obtained.

Interpolation position data of slave robot on which motion amount of master robot is reflected=T0s-1s| interpolation position data of slave robot Based on the interpolation position data thus corrected, the motion amount on each axis is determined (Step S52), acceleration/deceleration processing is performed (Step S53), and a command is issued to the motor (Step S54). Then, a notice of interpolation position data receipt is issued to the stored master robot (Step S55), the index i is increased by "1" (Step S56), and the control returns to Step S45.

The processing in Steps S45 through S56 is executed repeatedly until the index i reaches the number of interpolation points.

On the other hand, if the master robot determines in Step S30 that the master robot has received the notice of interpolation position data receipt issued by the processor of each slave robot in the processing in Step S55 from all the slave robots, the index i is increased by "1" (Step S31), and the control returns to Step S24. The processing in Steps S24 through S31 is executed repeatedly until the index i reaches the number of interpolation points.

If the index i reaches the number of interpolation points, the control goes from Step S24 to Step S20, and the processing in Step S20 and the following steps is executed.

On the other hand, the controller of the slave robot also executes the processing in Steps S45 through S56 repeatedly. If the index i reaches the number of interpolation points, the control goes from Step S45 to Step S41, and the processing in Step S41 and the following steps is executed.

Thus, the controllers of the master robot and slave robot execute the above-described processing repeatedly until the line is read from the master program and slave program. When a line to be read becomes absent, the procedure for the master robot proceeds from the processing in Steps S21 to the processing in Step S32. Also, the procedure for the slave robot proceeds from the processing in Steps S42 to the processing in Step S57.

It is assumed that the line to be read from the master program become absent for the master robot earlier than for the slave robot and the procedure of the processor of the master robot proceeds to Step S32 earlier than that of the slave robot. In this case, the processor of the master robot sends the latest position interpolation data determined in Step S25, stored in a register, and the stored synchronously or cooperative operation start position data to the slave robot via the communication line (Step S32), and determines whether or not a notice of completion has been sent from all the slave robots (Step S33). The processor of the master robot executes the processing in Steps S32 and S33 repeatedly until the notice of completion has been sent from all the slave robots, and continues to send the finally sent interpolation position data and synchronously cooperative operation start position data. Specifically, although the operation of the master robot is stopping, the finally sent interpolation position data and synchronously cooperative operation start position data are sent continuously to the slave robot.

On the other hand, the slave robot executes the processing in Steps S41 through S56 as long as a command line is read from the slave program. In this case, since the data received in Step S47 are the interpolation position data and synchronously cooperative operation start position data that were finally sent from the master robot, the transformation matrix determined by the processing in Step S50 is the same.

After the operation of the master robot is finished, the slave robot makes the same correction (amount) (Step S51), and is driven based on the slave program. When a line to be commanded becomes absent in the slave program, the procedure for the slave robot proceeds to Step S57, where the notice of completion is issued to the master robot via the communication line, and then determines whether or not a completion command has been sent from the master robot (Step S58). If the completion command has not been sent, the distance of motion of the latest line, determined in Step S43, is divided by the number of interpolation points, the resultant value is multiplied by the number of interpolation points indicated by the index i, and the obtained value is added to the motion start position of the latest line to determine the interpolation position data (Step S59). Specifically, this interpolation position data is the final position, and is determined finally by the processing in Step S46 of the latest line. This data is the same as the interpolation position data stored in the register, so that it need not be determined by performing calculations again and can be obtained merely by reading the value stored in the register.

Then, the processing in Steps S60 through S67, which is the same as the processing in Steps S47 through S55, is executed. The interpolation position data determined in Step S59 is the same as the interpolation position data determined in Step S46 in the latest line, and for the transformation matrix determined in Step S63, the synchronously cooperative operation start position data and interpolation position data sent from the master robot are not changed. Therefore, this correction (amount) is the same as the correction (amount) determined finally in the latest line. As a result, the corrected interpolation position data determined in Step S64 is the same as the latest interpolation position data determined in Step S51 in the latest line. As a result, the motion amount (incremental amount) on each axis becomes "0", and no command is issued to the motor, so that the robot becomes in a stopped state. The processing in Steps S57 through S67 is executed repeatedly until the completion command is sent from the master robot. If the completion command is sent from the master robot, the processing of this slave program ends.

On the other hand, when the notice of completion is received from all the slave robots (Step S33), the processor of the master robot issues the completion command to all the slave robots (Step S33), and turns off the outputted signal for informing the completion of the master program to the operator (Step S35). Upon receipt of this completion command, as described above, the slave robot stops its operation, and this processing for synchronously cooperative operation ends.

In contrast with the above, when the slave robot finishes the processing of the slave program earlier than the master robot, the processor of the master robot executes the processing in Steps S20 through S31 repeatedly, and continues to send the synchronously cooperative operation start position and the interpolation position data to the slave robot in Step S26. The procedure for the slave robot proceeds from Step S42 to Step S57, and the processing in Steps S57 through S67 is executed repeatedly. In this case, the interpolation position data determined in Step S59 is, as described above, the latest interpolation position data in the latest line of the slave program and the final command position. For this interpolation position data, by the synchronously cooperative operation start position data and interpolation position data sent from the master robot, the interpolation position data corrected by using the transformation matrix determined in Step S63 is determined, and further the motion amount on each axis is determined, the acceleration/deceleration processing is performed, and the motor for each axis is driven (Steps S64 through S67).

Then, the execution of the master program is also completed and the procedure proceeds from Step S21 to Step S32. When the master robot controller receives the notice of completion from all the slave robot controllers (Step S33), it issues the notice of completion to all the slave robot controllers (Step S34), turns off the outputted signal for informing the completion of the master program to the operator (Step S35), and stops the operation of the master robot. Upon receipt of this completion command (Step S59), the slave robot also stops its operation.

Next, in the case where the programs are stored in each robot as shown in FIG. 8, the master program is read in the robot controller NO. 1 and the slave program is read in the robot controller No. 2 according to the second combination, to execute the above-described processing for synchronously cooperative operation with the robot No. 1 as a master robot and the robot No. 2 as a slave robot. As a result, the robots No. 1 and No. 2 are operated in synchronous cooperation. Parallelly with the above, the master program is read in the robot controller NO. 3 and the slave program is read in the robot controller No. 4 according to the third combination, to execute the above-described processing for synchronously cooperative operation with the robot No. 3 as a master robot and the robot No. 4 as a slave robot, substantially simultaneously with the synchronously cooperative operation of the robots Nos. 1 and 2.

Further, when the synchronously cooperative operations of the robots No. 1 and No. 2 and the robots No. 3 and No. 4 are finished, in the example shown in FIG. 8, the robots No. 1 and No. 3 perform the synchronously cooperative operation and the robots No. 2 and No. 3 perform the normal and independent operation by the respective normal programs.

In the above-described embodiment, the combination of robots operating in synchronous cooperation is set in the master robot as a link pattern number, and the program for performing the synchronously cooperative operation is set in each robot. However, the configuration may be such that the master program and the robot number executing this master program and each slave program and the robot number executing the slave program have been programmed in advance, this program is input in any robot controller, by this robot controller, the master program is sent to the controller of a specified robot and each slave program is sent to the controller of each specified robot via a communication line, and at the time when the sending is finished, start is effected, by which the processing shown in FIGS. 9 to 14 is started by each robot controller.

According to the present invention, a synchronously cooperative operation can be executed between robots selected from a plurality of robots connected by communication lines, and other robots that do not perform the synchronously cooperative operation can execute an independent operation. Therefore, highly efficient work can be performed. Also, the combination of robots can be changed according to the object to be worked to perform a synchronously cooperative operation, so that the range of the object capable of being worked is widen, and optimum and efficient work can be executed.

What is claimed is:

1. A control system for performing a synchronously cooperative operation using a plurality of robots comprising:

a plurality of robot controllers connected with one another by a communication line, for respectively controlling the plurality of robots, wherein at least one master robot controller for controlling at least one master robot selected from said plurality of robots sends data regarding positions of taught points and interpolation points for the master robot to each of one or more slave robot controllers for controlling one or more slave robots selected from the rest of the plurality of robots through the communication line, so that each slave robot controller controls the slave robot thereof to perform the synchronously cooperative operation with said master robot based on the data received from said master robot controller.

2. A control system for a plurality of robots according to claim 1, wherein each of said master robot controller and said slave robot controllers stores a series of operation programs as a combination of a master program to operate the controlled robot as the master robot, a slave program to operate the controlled robot as the slave robot and a normal program to operate the controlled robot independently of the other robots.

3. A control system for a plurality of robots according to claim 1, wherein the synchronously cooperative operation of said master robot and said slave robots is started and terminated by a program command in an operation program stored in the master robot controller.

4. A control system for cooperative operation of a plurality of robots according to claim 1, wherein each of said master controller and said slave controllers stores an operation program with an attribute for the synchronously cooperative operation, and the synchronously cooperative operation of said master robot and said slave robots starts when said master robot controller and said slave robot controller start execution of the operation programs having the attributes of the synchronously cooperative operation, and terminates with completion of the operation programs having the attribute.

5. A control system for a plurality of robots according to claim 1, wherein said master robot controller and said slave robot controller output signals indicative of the midst or the ready of the synchronously cooperative operation when said master robot and said slave robots are in the midst or the ready of the synchronously cooperative operation.

6. A control system for performing a synchronously cooperative operation using a plurality of robots comprising:

robot controllers connected with one another by a communication line, for respectively controlling at least three robots, wherein at least one master robot controller for controlling at least one master robot selected from said robots sends data regarding positions of taught points and interpolation points for the master robot to each of one or more slave robot controllers for controlling one or more slave robots selected for the master robot from the rest of the plurality of robots through the communication line, so that each slave robot controller controls the slave robot thereof to perform the synchronously cooperative operation with said master robot based on the data received from said master robot controller.

7. A control system for a plurality of robots according to claim 6, wherein each of said plurality of robot controllers has a series of operation programs as a combination of a master program to operate the associated robot as the master robot, a slave program to operate the associated robot as the slave robot and a normal program to operate the associated robot independently of the other robots, so as to perform the cooperation of the master robot and the slave robot sequentially.

8. A control system for a plurality of robots according to claim 6, wherein the synchronously cooperative operation of said master robot and said slave robots is started and terminated by a program command in an operation program stored in the master robot controller.

9. A control system for a plurality of robots according to claim 6, wherein each of said master controller and said slave controllers stores an operation program with an attribute for the synchronously cooperative operation, and the synchronously cooperative operation of said master robot and said slave robots starts when said master robot controller and said slave robot controller start execution of the program having the attribute of the synchronously cooperative operation, and terminates with completion of the operation program having the attribute.

10. A control system for a plurality of robots according to claim 6, wherein said master robot controller and said slave robot controller output a signal indicative of the midst or the ready of the synchronously cooperative operation when said master robot and said slave robots are in the midst or the ready of the synchronously cooperative operation.

* * * * *